(12) United States Patent
Bhavsar et al.

(10) Patent No.: US 7,240,749 B2
(45) Date of Patent: Jul. 10, 2007

(54) HYBRID ELECTRIC VEHICLE WITH VARIABLE DISPLACEMENT ENGINE

(75) Inventors: Chinu P. Bhavsar, Ann Arbor, MI (US); Joanne T. Woestman, Dearborn, MI (US); Prabhakar B. Patil, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/922,491

(22) Filed: Aug. 19, 2004

(65) Prior Publication Data

US 2005/0011690 A1 Jan. 20, 2005

Related U.S. Application Data

(60) Continuation of application No. 10/707,372, filed on Dec. 9, 2003, which is a division of application No. 09/547,275, filed on Apr. 11, 2000, now Pat. No. 6,691,807.

(51) Int. Cl.
*B60K 6/04* (2006.01)

(52) U.S. Cl. .................. 180/65.2; 903/941; 903/943

(58) Field of Classification Search ............. 180/65.2, 180/65.3, 65.4, 65.6; 701/22, 70; 123/198 F
See application file for complete search history.

(56) References Cited

U.S. PATENT DOCUMENTS

| 4,335,429 | A | 6/1982 | Kawakatsu |
| 4,583,505 | A | 4/1986 | Frank et al. |
| 4,770,137 | A | 9/1988 | Okabe et al. |
| 5,368,000 | A | 11/1994 | Koziara |
| 5,408,966 | A | 4/1995 | Lipinski et al. |
| 5,408,974 | A | 4/1995 | Lipinski et al. |
| 5,437,253 | A | 8/1995 | Huffmaster et al. |
| 5,490,486 | A | 2/1996 | Diggs |
| 5,495,912 | A | 3/1996 | Gray, Jr. et al. |
| 5,568,795 | A | 10/1996 | Robichaux et al. |
| 5,667,029 | A | 9/1997 | Urban et al. |
| 5,678,646 | A | 10/1997 | Fliege |
| 5,691,588 | A | 11/1997 | Lutz et al. |
| 5,697,466 | A | 12/1997 | Moroto et al. |
| 5,698,905 | A | 12/1997 | Ruthlein et al. |
| 5,713,425 | A | 2/1998 | Buschhaus et al. |
| 5,713,426 | A | 2/1998 | Okamura |
| 5,713,427 | A | 2/1998 | Lutz et al. |
| 5,755,302 | A | 5/1998 | Lutz et al. |

(Continued)

FOREIGN PATENT DOCUMENTS

DE 4324010 1/1995

(Continued)

OTHER PUBLICATIONS

US 6,032,738, 03/2000, Boncan et al. (withdrawn)

*Primary Examiner*—Frank Vanaman
(74) *Attorney, Agent, or Firm*—Allan J. Lippa; Alleman Hall McCoy Russell & Tuttle LLP

(57) ABSTRACT

A hybrid electric vehicle 10 having a propulsion system 12 which integrates a motor-generator 14 and a variable displacement internal combustion engine 16. Motor-generator 14 and engine 16 are each operatively coupled to drive train 17 of vehicle 10, and cooperatively power vehicle 10.

10 Claims, 3 Drawing Sheets

U.S. PATENT DOCUMENTS

| | | |
|---|---|---|
| 5,775,449 A | 7/1998 | Moroto et al. |
| 5,788,006 A | 8/1998 | Yamaguchi |
| 5,791,427 A | 8/1998 | Yamaguchi |
| 5,799,744 A | 9/1998 | Yamaguchi et al. |
| 5,806,617 A | 9/1998 | Yamaguchi |
| 5,813,383 A | 9/1998 | Cummings |
| 5,823,280 A | 10/1998 | Lateur et al. |
| 5,823,281 A | 10/1998 | Yamaguchi et al. |
| 5,975,052 A | 11/1999 | Moyer |
| 5,984,034 A | 11/1999 | Morisawa et al. |
| 5,992,390 A | 11/1999 | Moyer |
| 6,116,363 A * | 9/2000 | Frank ................. 180/65.2 |
| 6,382,163 B1 | 5/2002 | Murray et al. |
| 6,484,833 B1 * | 11/2002 | Chhaya et al. ............ 180/65.4 |

FOREIGN PATENT DOCUMENTS

| | | |
|---|---|---|
| DE | 19712246 | 11/1997 |
| EP | 0 768 203 A1 * | 4/1997 |
| EP | 0 800 949 A2 * | 10/1997 |
| EP | 0 839 683 A2 * | 5/1998 |
| EP | 0970838 | 1/2000 |
| EP | 0781680 | 6/2002 |
| GB | 2340463 | 2/2000 |
| JP | 11182275 | 6/1999 |
| RU | 2132784 | 7/1997 |
| WO | 99/24280 | 5/1999 |

* cited by examiner

HYBRID ELECTRIC VEHICLE WITH VARIABLE DISPLACEMENT ENGINE

CROSS-REFERENCE TO RELATED APPLICATIONS

This application is a continuation of U.S. application Ser. No. 10/707,372, filed Dec. 9, 2003 which is a divisional of U.S. application Ser. No. 09/547,275, filed Apr. 11, 2000, now U.S. Pat. No. 6,691,807, issued Feb. 17, 2004.

BACKGROUND OF THE INVENTION

1. Field of the Invention

This invention relates to a hybrid electric vehicle and more particularly, to a hybrid electric vehicle having a variable displacement engine which provides for improved fuel economy and load performance.

2. Background Art

Various types of automotive vehicles have been designed and manufactured for the purpose of improving fuel economy. One type of vehicle, commonly known as a hybrid electric vehicle ("HEV"), utilizes both an internal combustion engine and one or more electric motors to generate power and torque. The electric motor(s) within a hybrid electric vehicle provides the vehicle with additional degrees of freedom in delivering the driver-demanded torque. Particularly, hybrid electric vehicles may have the flexibility of using the electric motor(s) as the sole source of torque at low load operating conditions. Additionally, at relatively high loads, a hybrid electric vehicle can employ or activate both the internal combustion engine and the electric motor(s) to supply the driver-demanded torque. Due to the ability of the electric motor(s) to augment the engine generated torque at high load operating conditions, hybrid electric vehicles typically employ relatively small or "downsized" internal combustion engines, which provide for improved fuel economy.

One drawback associated with these hybrid electric type vehicles is that the electric motors used within these vehicles receive power from an electrical energy storage device (e.g., a battery) which becomes depleted over time. When the electrical energy storage device or battery becomes depleted, the motors are no longer able to supplement the engine to deliver relatively high amounts of torque. This especially presents a problem in steady state high load situations (e.g., when towing or hauling heavy cargo), as the propulsion system (e.g., the engine and electric motor) may not be able to deliver the desired or demanded torque consistently and/or over an extended period of time. Thus, when high load steady state performance is required within a vehicle (e.g., within large trucks, sport-utility vehicles, and other vehicles that are often used for towing or hauling), the vehicle's engine cannot be "downsized" and the hybridization-related fuel economy benefits cannot realized to the maximum potential.

Another type of vehicle, known as a variable displacement engine ("VDE") type vehicle, conserves fuel by selectively disabling or deactivating some of the engine's cylinders under certain operating conditions. Particularly, during low engine load operation, a VDE type vehicle conserves fuel by operating on only some of the engine's cylinders (e.g., on four, five, six, or seven of eight cylinders). During relatively high speeds and/or high load operation, a VDE type vehicle can meet the driver-demanded speed and/or torque by operating on all of the engine's cylinders (e.g., on eight of eight cylinders). While these VDE type vehicles improve fuel economy and provide the torque required to satisfy relatively high load operation, they suffer from some drawbacks.

For example and without limitation, during relatively low and/or transient load operation (e.g., when the operating load varies significantly over a short period of time), the power train of a VDE type vehicle frequently shifts between various cylinder operating modes (e.g., the engine shifts between four, six, eight and ten cylinder operation). This frequent shifting between cylinder operating modes results in noise and vibration harshness ("NVH") problems which are perceivable by the driver and which give the vehicle a "rough", "inconsistent" and/or "non-responsive" feel or ride.

There is therefore a need for a vehicle which provides an improved fuel economy, which provides steady state high load performance, and which operates smoothly and responsively under transient load conditions.

SUMMARY OF THE INVENTION

It is a first object of the invention to provide an automotive vehicle which overcomes at least some of the previously delineated drawbacks of prior automotive vehicles.

It is a second object of the invention to provide an automotive vehicle which delivers and/or generates torque by use of a variable displacement engine and by use of one or more electric motors.

It is a third object of the invention to provide a hybrid electric vehicle having a variable displacement engine which allows the vehicle to perform under steady state high load operating conditions, while maintaining an improved fuel economy under relatively low or moderate load operating conditions.

It is a fourth object of the invention to provide an automotive vehicle having a variable displacement engine and which utilizes an electric motor to generate torque when operating under transient loads, thereby reducing the frequency of cylinder activation and deactivation within the variable displacement engine.

According to a first aspect of the present invention, a hybrid electric vehicle is provided. The hybrid electric vehicle includes a drive line; a battery which stores an amount of electrical charge and which selectively provides electrical power; and a sensor which is coupled to the battery and which is effective to estimate the amount of electrical charge and to generate a first signal based upon the estimated amount of electrical charge. The vehicle further includes an electric motor which is operatively coupled to the battery and to the drive line, which receives the electrical power from the battery, and which selectively provides torque to the drive line, and a variable displacement engine which is operatively coupled to the drive line and which selectively provides torque to the drive line. A controller is communicatively coupled to the variable displacement engine, to the electric motor, and to the sensor. The controller is effective to determine a requested torque to be provided to the drive line, to receive the first signal, and to partition the requested torque into an engine torque and a motor torque, based upon the first signal. The controller is further effective to cause the electric motor to provide the motor torque to the drive line, and to cause the variable displacement engine to provide the engine torque to said drive line.

According to a second aspect of the present invention, a method of delivering torque to a vehicle drive train is provided. The method includes the steps of providing a variable displacement internal combustion engine which selectively delivers torque to the drive train; providing a motor which selectively delivers torque to the drive train; providing an electrical charge storage device which supplies electrical energy to the motor; estimating an amount of charge which is held within the electrical charge storage device; receiving at least one signal from a driver-operated control; calculating a torque value based upon the at least one signal; partitioning the torque value into a desired motor torque and a desired engine torque based upon the estimated amount of charge and the torque value; causing the motor to deliver the desired motor torque to the drive train; and causing the variable displacement internal combustion engine to deliver the desired engine torque to the drive train, thereby powering the vehicle.

These and other features, aspects, and advantages of the invention will become apparent by reading the following specification and by reference to the following drawings.

DETAILED DESCRIPTION OF THE PREFERRED EMBODIMENT(S)

Figure 1:
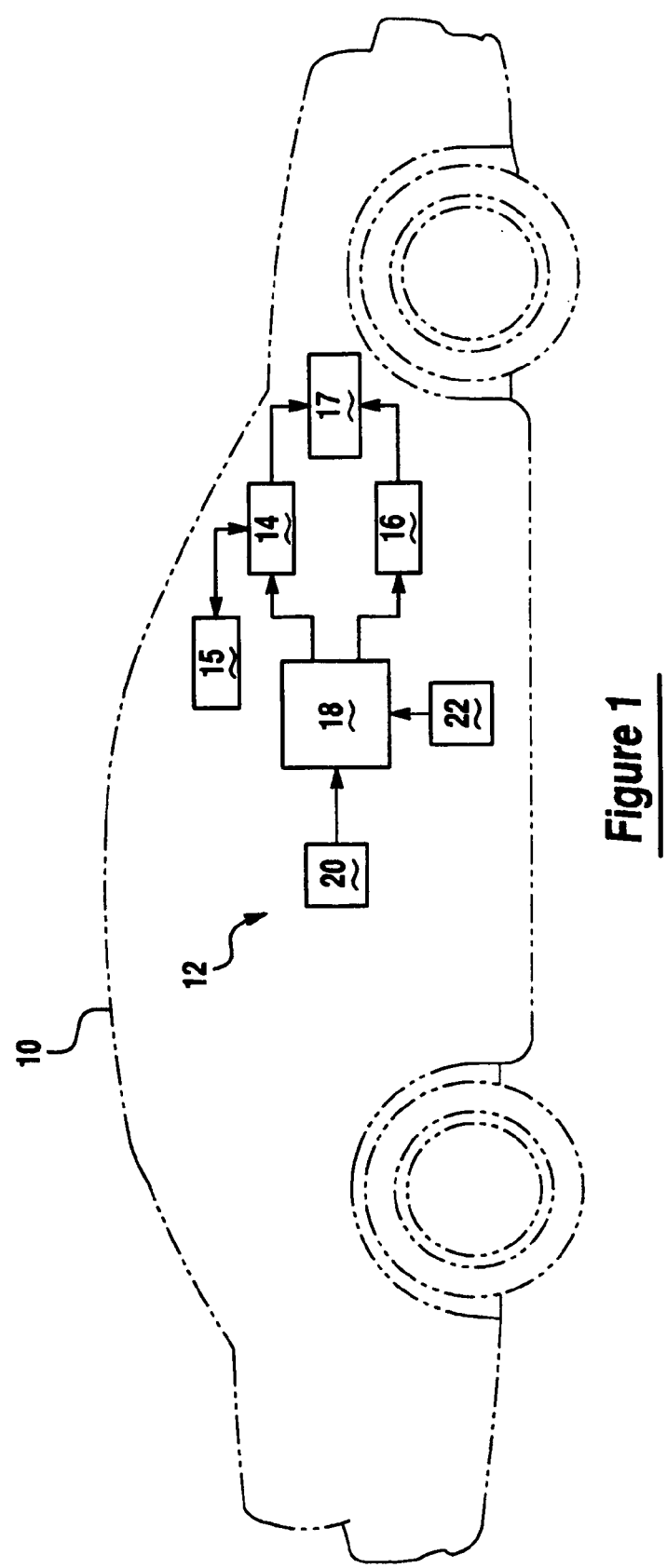
FIG. 1 is a block diagram of a vehicle including a propulsion system which is made in accordance with the teachings of a preferred embodiment of the present invention.
Figure 2:
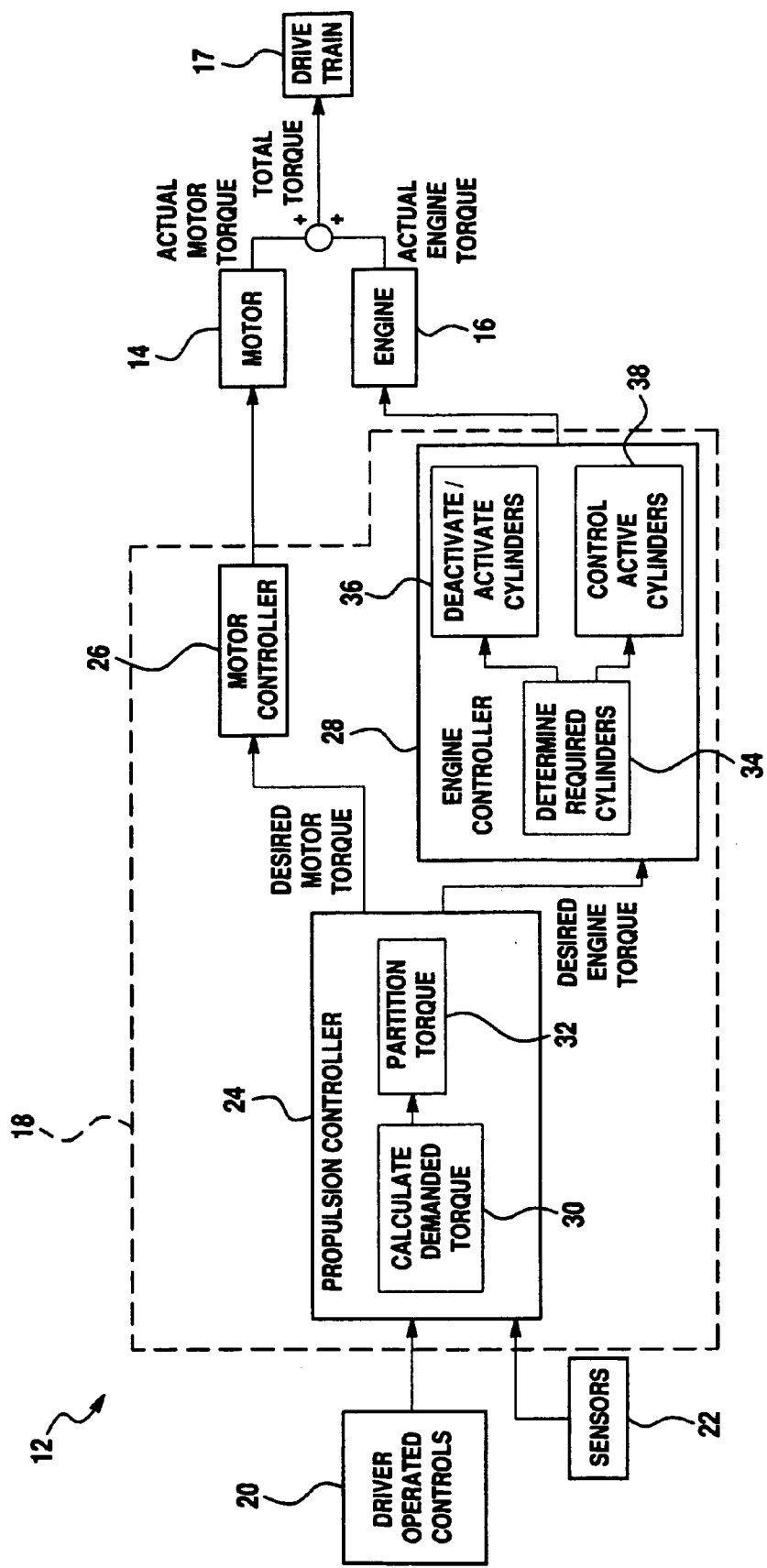
FIG. 2 is a block diagram illustrating the operational functionality of the propulsion system utilized within the vehicle shown in FIG. 1.

Referring now to FIGS. 1 and 2, there is shown an automotive hybrid electric vehicle 10 having a propulsion system 12 which is made in accordance with the teachings of the preferred embodiment of the present invention. Propulsion system 12 includes an electric machine or motor 14, which is operatively coupled to a conventional electrical energy storage device 15 (e.g., a battery or other electrical energy storage device), and a variable displacement internal combustion engine 16. Electric motor 14 and engine 16 are each selectively and operatively coupled to the vehicle's driveline or drive train 17 (e.g., to the drive shaft of the vehicle) and cooperatively deliver power and torque to the drive train 17, thereby powering the vehicle 10. A control system or controller 18 is electrically and communicatively coupled to conventional user or driver operated controls or components 20 and to conventional vehicle operating condition sensors 22. As described more fully and completely below, controller 18 receives signals and/or commands generated by controls 20 and sensors 22, and processes and utilizes the received signals to determine the amount of torque which is to be provided to the vehicle's drive train 17 and to selectively cause motor 14 and engine 16 to cooperatively provide the desired torque to the drive train 17.

In the preferred embodiment of the invention, electric machine or motor 14 is a conventional electric motor-generator unit which is adapted for use in a hybrid electric vehicle. Electric motor-generator 14 is operatively coupled to the drive shaft (not shown) of the vehicle 10 in a known and conventional manner. In alternate embodiments, motor-generator 14 is operatively and conventionally coupled to other portions of the drive train or drive line 17 of the vehicle 10 (e.g., to one or more of the axles or differential gear units of vehicle 10), and to other mechanical components of vehicle 10. In other alternate embodiments, propulsion system 12 may include several motor-generators. Motor-generator 14 selectively provides torque to the drive shaft or drive train 17 of vehicle 10, thereby selectively powering vehicle 10. Electric motor-generator 14 also functions as a motor to convert drive train energy into electrical energy which is used to electrically power various electrical components of vehicle 10. Electrical charge storage device 15 supplies power to motor-generator 14 and can further be used to recover and store during vehicle braking. While the following description is made with reference to the motor-generator 14, it should be appreciated that other types of electric machines or motor-generators may be used in combination with the variable displacement engine 16 to deliver torque to the drive train 17 of vehicle 10.

In alternate embodiments, motor 14 may comprise a pair of motor-generators arranged in a conventional "dual-split" or "power-split" type hybrid configuration. Particularly, in such alternate embodiments, the engine (e.g., engine 16) and the pair of motor-generators are interconnected by use of a conventional planetary gear set or system, which is operatively coupled to and transfers torque and power to the vehicle's drive train (e.g., to the vehicle's drive shaft).

Variable displacement engine 16 is a conventional multi-cylinder internal combustion variable displacement engine which includes several cylinders (e.g., four, six, eight, ten or more cylinders) and which is capable of operating on less than a full complement of cylinders. That is, engine 16 is able to selectively disable or deactivate one or more cylinders and operate on less than all of its cylinders to conserve fuel at relatively light or low load operating conditions. In one non-limiting embodiment, engine 16 comprises the variable displacement engine which is described in U.S. Pat. No. 5,490,486 of Diggs which has been assigned to the present assignee. Engine 16 is operatively coupled to the driveline or drive train 17 (e.g., to the drive shaft) of vehicle 10 in a known and conventional manner and selectively provides torque to the drive train 17 of vehicle 10, thereby powering vehicle 10.

In the preferred embodiment, control system 18 includes several microprocessors or controllers 24, 26 and 28 as well as other chips and integrated circuits which cooperatively control the operation of propulsion system 12. Controllers 24, 26 and 28 comprise commercially available, conventional, and disparate chips or devices, which are operatively and communicatively linked in a cooperative manner. Controllers 24, 26 and 28 each include permanent and temporary memory units, which are adapted to and do store at least a portion of the operating software which directs the operation of control system 18. In one non-limiting embodiment, controllers 24, 26 and 28 are embodied within a single controller, chip, microprocessor or device. Controller 26 is a conventional controller of the type which is used to control an HEV motor-generator, and controller 28 is a conventional controller of the type which is used to provide control to a variable displacement engine. As described more fully and completely below, controller 24 is effective to determine the total amount of torque which is to be provided or delivered to drive train 17 and to partition or divide the total amount of torque between motor 14 and engine 16. Controller 24 selectively stores information and data, including information associated with the operation of the invention such as data defining engine and cylinder operating conditions, engine loads, vehicle speeds, state-of-charge conditions of battery 15, and other data, which are used by controller 24 to determine the amount of torque which should be provided to drive train 17 by motor 14 and by engine 16.

Driver operated controls 20 comprise a plurality of conventional and commercially available switches, devices and other components which accept user or driver selected inputs, thereby allowing the user or driver to operate vehicle 10. In one non-limiting embodiment of the invention, controls 20 include without limitation a vehicle accelerator or "gas pedal", a vehicle shifter which allows the driver to select between one or more operating speeds or gear engagements, a brake pedal, and a speed control system. Controls 20 provide commands and/or operating data to control system 18 which utilizes these commands or data to determine the amount of torque which is to be delivered by vehicle 10 and to selectively cause motor 14 and engine 16 to cooperatively provide the desired torque.

Sensors 22 comprise a plurality of conventional and commercially available sensors which measure and/or acquire information pertaining to the motor 14, electrical charge storage device 15, engine 16 and vehicle 10 (e.g., vehicle operating condition data). In the preferred embodiment of the invention, sensors 22 include one or more conventional vehicle and/or engine speed sensors and one or more sensors adapted to estimate the amount of charge remaining within battery 15. Sensors 22 generate one or more signals to controller 18 based upon these measured and/or estimated values. Particularly, sensors 22 provide vehicle operating data to control system 18 which utilizes this data to determine the amount of torque which is to be delivered to drive train 17 and to selectively cause motor 14 and engine 16 to cooperatively provide the desired torque.

In operation, control system 18 (i.e., propulsion controller 24) receives commands, data, and/or signals from driver operated controls 20 and from vehicle sensors 22. Based upon this received data, propulsion controller 24 calculates or determines the overall amount of torque which is being demanded or requested by the driver/user of the vehicle 10, as illustrated in functional block or step 30. In one non-limiting embodiment, this overall "desired" torque calculation or determination is made by use of conventional algorithms and/or by referencing conventional database tables or matrixes stored within controller 24.

Once the overall "desired" or "demanded" torque has been calculated, controller 24 proceeds to functional block or step 32, and determines the amount or percentage of the desired torque which is to be provided by motor 14 (e.g., the "desired motor torque") and the amount or percentage of the desired torque which is to be provided by engine 16 (e.g., the "desired engine torque"). Particularly, controller 24 determines the most efficient use of the torque providing sources (i.e., motor 14 and engine 16), and partitions or divides the demanded torque in a manner which balances fuel economy and vehicle performance. One non-limiting example of this "partition" function or strategy performed by controller 24 is illustrated by flow diagram 50 shown in FIG. 3.

Figure 3:
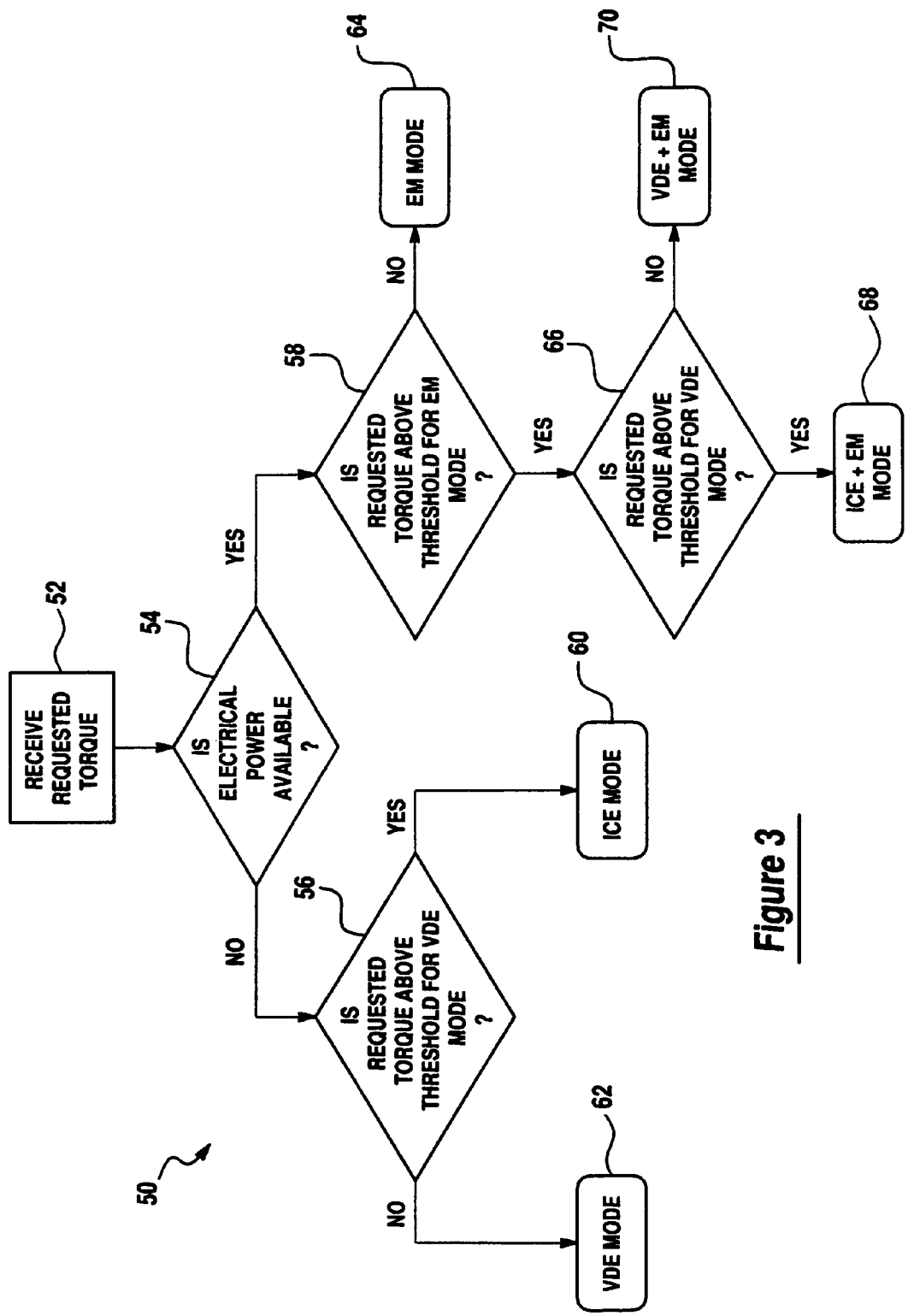
FIG. 3 is a block diagram illustrating one non-limiting example of the partitioning function performed by the propulsion system shown in FIG. 1.

Referring now to FIG. 3, controller 24 receives the desired or demanded torque in functional block or step 52. Controller 24 then determines whether electrical power is available (e.g., within battery 15) to allow motor 14 to provide torque to the drive train 17, as illustrated in functional block or step 54. In one non-limiting embodiment, controller 24 determines whether electrical power is available by estimating the amount of charge remaining within battery 15 and comparing the measured amount or value to a predetermined value stored within controller 18. If electrical power is not available, controller 24 proceeds to functional block or step 56, otherwise controller 24 proceeds to functional block or step 58. In step 56, controller 24 determines whether the requested torque exceeds a "VDE mode" threshold torque value. If the requested torque exceeds the "VDE mode" threshold value, controller 24 "partitions" or allocates all of the requested torque to engine 16 (e.g., the "desired motor torque" is set to zero), and causes engine 16 to run in "ICE mode", as illustrated in functional block or step 60. Particularly, controller 24 sends a signal to engine 16 which is effective to activate all of the cylinders of the engine 16 and to deactivate the "variable displacement" function of engine 16. Thus, when operating in "ICE mode", engine 16 runs on a full complement of cylinders (e.g., on ten of ten cylinders).

If the requested torque does not exceed the "VDE mode" threshold value, controller 24 partitions or allocates all of the requested torque to engine 16, and causes engine 16 to run in "VDE mode", as illustrated in functional block or step 62. When operating in "VDE mode", engine controller 34 determines the number of cylinders (e.g., the cylinder operating mode) that is required to deliver the requested torque to drive train 17 and activates only that number of cylinders.

By use of the above-described partition strategy, system 10 causes engine 16 to operate on all cylinders and to provide a maximum amount or percentage of torque to drive train 17 during operating conditions in which the battery 15 has been "drained" or discharged. It should be appreciated that these types of operating conditions (e.g., where battery 15 has been drained) correspond to steady state high load operating conditions. System 12 thus provides all of the requested torque through engine 16 during relatively high load operating conditions where engine 16 is the most efficient torque providing source. Moreover, the strategy 50 used by system 12 further substantially prevents engine 16 from changing between cylinder operating modes unless necessary, thereby reducing the frequency that cylinders are activated and deactivated within engine 16.

The value of the "VDE mode" threshold is stored within controller 24 and may be a dynamic value (e.g., a function of vehicle speed or engine speed). In one non-limiting embodiment, controller 24 compares the requested torque to several different "VDE mode" thresholds, which each corresponds to a unique cylinder operating mode of engine 16.

If electrical power is available in step 54, controller 24 proceeds to functional block or step 58. In step 58, controller 24 determines whether the requested torque exceeds an "EM mode" threshold value. If the requested torque does not exceed the "EM mode" threshold value, controller 24 "partitions" or allocates a maximum amount or percentage (e.g., 100%) of the requested torque to motor 14 and causes system 12 to run solely in "EM mode", as illustrated in functional block or step 64. When only "EM mode" is activated (i.e., when neither "VDE mode" nor "ICE mode" is concurrently activated), torque is provided solely by motor 14 and engine 16 can be "shut off" or disabled. In this manner, propulsion system 12 utilizes motor 14 to provide all of the requested torque during "low load" operating conditions, where the engine 16 is most inefficient, thereby conserving fuel. The value of the "EM mode" threshold is stored within controller 24 and may be a dynamic value (e.g., a function of vehicle speed or engine speed).

If the requested torque does exceed the "EM mode" threshold value, controller 24 proceeds to functional block or step 66, and determines whether the requested torque exceeds the "VDE mode" threshold value. If the requested torque exceeds the "VDE mode" threshold value, controller 24 causes propulsion system 12 to run in "ICE mode" and "EM mode", as illustrated in functional block or step 68, and "partitions" or allocates a maximum amount or percentage of the requested torque to engine 16. When operating in "ICE mode" and "EM mode", propulsion system 12 utilizes all cylinders of engine 16 as well as motor 14 to provide torque to the vehicle drive line 17.

If the requested torque is not greater than the "VDE mode" threshold value (e.g., during moderate and/or transient load operating conditions), controller 24 proceeds to functional block or step 70, and causes the propulsion system to operate in "EM mode" and "VDE mode". When operating in "EM mode" and "VDE mode", controller 24 partitions or allocates the requested torque between motor 14 (i.e., the desired motor torque) and engine 16 (i.e., the desired engine torque) based upon the value of the requested torque. In one non-limiting embodiment, the torque partition or allocation is computed or determined by use of one or more database tables or matrixes stored within controller 24. When the requested torque changes relatively rapidly (e.g., during transient load operating conditions), controller 24 allocates the majority of the transient torque values or response to motor 14 and maintains the torque allocated to engine 16 relatively constant. In this manner, controller 18 substantially prevents engine 16 from frequently shifting between cylinder operating modes (i.e., the frequent activation and deactivation of the cylinders), and achieves a smoother and more responsive performance.

It should be appreciated that the above-described torque partitioning function does not limit the scope of the invention, and that in other alternate embodiments, controller 24 performs other steps and considers different and/or additional vehicle operating attributes, conditions and other factors when partitioning or allocated the demanded torque.

Once the demanded torque has been "partitioned", controller 24 generates a signal representing the desired "motor torque" to motor controller 26, and a signal representing the desired "engine torque" to engine controller 28. Motor controller 26 receives the desired "motor torque" and generates a control signal to motor 14 which is effective to cause motor 14 to produce and/or deliver the desired torque to drive train 17.

Engine controller 28 receives the desired "engine torque" and determines the number of cylinders which are required to provide the requested torque (e.g., the cylinder operating mode of engine 16), as illustrated in functional block or step 34. In functional block or step 36, engine controller 28 selectively deactivates or disables any cylinders which are not "necessary" to provide the desired torque, or selectively activates or enables and cylinders which are "necessary" to provide the desired torque. In functional block or step 38, controller 28 generates a control signal to engine 16 which is effective to control the timing and operation of engine 16 and to cause engine 16 to produce and/or deliver the desired torque to drive train 17.

It should be appreciated that the combination of a hybrid electric vehicle and a variable displacement engine provides significant advantages over prior systems. For example and without limitation, prior hybrid electric vehicles require a "downsized" or relatively small engine to achieve improved fuel economy. This "downsized" or relatively small engine substantially prevents hybrid electric vehicles from performing under steady state high load operating conditions. The integration of a variable displacement engine within the present invention allows the hybrid electric vehicle 10 to perform under steady state high load operating conditions (e.g., by activating all of the engine's cylinders), while still allowing the vehicle 10 to achieve improved fuel economy under low load operating conditions (e.g., by disabling one or more cylinders of the variable displacement engine). Hence, instead of "downsizing" a hybrid electric vehicle's engine to realize fuel economy benefits, the present invention integrates a variable displacement engine to efficiently deliver low torque, while maintaining the ability to deliver high torque when necessary.

The present invention further solves the problems associated with variable displacement engines which relate to the frequent shifting between cylinder operating modes during transient load operating conditions and NVH issues at low loads. Particularly, by allowing the electric motor to meet the transient torque demands in these types of operating conditions, the torque which is provided by engine 16 can be held relatively constant, thereby preventing the frequent shifting between cylinder operating modes within the engine 16 and giving vehicle 10 a "smoother" and more responsive "feel" and ride. Thus, the integration of a hybrid electric vehicle and a variable displacement engine provided by the present invention expands the range of operating loads in which the vehicle can operate efficiently without while maintaining the quality of vehicle performance.

It is understood that the invention is not limited by the exact construction or method illustrated and described above, but that various changes and/or modifications may be made without departing from the spirit and/or the scope of the inventions.

What is claimed is:

1. A system for a vehicle having a drive line comprising:
    a variable displacement engine capable of providing torque to drive the vehicle, said engine having a plurality of cylinders;
    a motor capable of providing torque to drive the vehicle; and
    an electrical storage device operatively connected to the motor and capable of providing electrical power to the motor,
    where during at least a fist condition of said electrical storage device, both said engine and said motor provide torque to the vehicle drive line to drive the vehicle, and said engine operates with some of said engine cylinders disabled during at least a portion of said first condition, and said engine operates with all of said engine cylinders active during at least another portion of said first condition, and
    during at least a second condition of said electrical storage device, said engine provides all requested torque to the vehicle drive line to drive the vehicle and said engine charges said electrical storage device, and said engine operates with some of said engine cylinders disabled during at least a portion of said second condition, and said engine operates with all of said engine cylinders active during at least another portion of said second condition;
    where at least during some of said first condition, said motor provides a more rapid torque change than the engine to achieve improved vehicle performance.

2. The system of claim 1 wherein during at least a third condition said engine is shut off.

3. The system of claim 1 wherein during at least a fourth condition said engine is disabled.

4. The system of claim 1 wherein said condition of said electrical storage device is an amount of electrical power in said storage device.

5. The system of claim 1 wherein said condition of said electrical storage device is an amount of charge stored in said storage device.

6. The system of claim 1 wherein said condition of said electrical storage device is an estimated amount of charge remaining in said storage device.

7. The system of claim 1 wherein said first condition of said electrical storage device is sufficient electrical power being available within said storage device to allow said motor to provide torque to the vehicle drive line.

8. The system of claim 1 wherein said first condition of said electrical storage device is when estimated charge within said storage device is greater than a threshold.

9. The system of claim 1 wherein said second condition of said electrical storage device is insufficient electrical power being available within said storage device to allow said motor to provide torque to the vehicle drive line.

10. The system of claim 1 wherein said second condition of said electrical storage device is when estimated charge within said storage device is less than a threshold.

* * * * *